US012427763B2

(12) United States Patent
Matsuzaki

(10) Patent No.: US 12,427,763 B2
(45) Date of Patent: Sep. 30, 2025

(54) ACCOMMODATING RACK, REPLACEMENT FRAME, RACK SYSTEM, AND PRINTING DEVICE

(71) Applicant: FUJI CORPORATION, Chiryu (JP)

(72) Inventor: Naoki Matsuzaki, Nishio (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/709,668

(22) PCT Filed: Nov. 24, 2021

(86) PCT No.: PCT/JP2021/043057
§ 371 (c)(1),
(2) Date: May 13, 2024

(87) PCT Pub. No.: WO2023/095221
PCT Pub. Date: Jun. 1, 2023

(65) Prior Publication Data

US 2025/0001754 A1 Jan. 2, 2025

(51) Int. Cl.
*B41F 15/34* (2006.01)
*B41F 15/12* (2006.01)

(52) U.S. Cl.
CPC .............. *B41F 15/34* (2013.01); *B41F 15/12* (2013.01)

(58) Field of Classification Search
CPC .......... B41F 15/12; B41F 15/16; B41F 15/34; B41F 15/36; B41F 15/40; B41P 2215/10
See application file for complete search history.

(56) References Cited

U.S. PATENT DOCUMENTS 5,107,760 A * 4/1992 Pratt ....................... B41F 15/36 101/115
2019/0337290 A1 11/2019 Hirukawa et al.

FOREIGN PATENT DOCUMENTS

GB 1587108 A * 4/1981 .......... B41F 15/0845
JP 07314639 A * 12/1995
JP 3085097 B2 * 9/2000

(Continued)

OTHER PUBLICATIONS

International Search report issued Feb. 15, 2022 in PCT/JP2021/043057, filed on Nov. 24, 2021, 3 pages.

*Primary Examiner* — Christopher E Mahoney
*Assistant Examiner* — Marissa Ferguson-Samreth
(74) *Attorney, Agent, or Firm* — Oblon, McClelland, Maier &Neustadt, L.L.P.

(57) ABSTRACT

Accommodating rack 51 is used in a printing device including a printing section that performs a printing process of viscous fluid on a processing object using a screen mask, and accommodates, in a shelf shape, a replacement frame including a support portion that supports a replacement member used in the printing device and a frame-side stopper. The accommodating rack includes an accommodating section configured to accommodate the replacement frame, a guide section configured to support the replacement frame and guide the replacement frame between the accommodating section and an outside, and a rack-side stopper protruding toward an inside of the frame from a reference outer surface of the replacement frame and engaging with the frame-side stopper to restrict removal of the replacement frame in a pulled-out state in which the replacement frame is pulled out from the accommodating rack.

9 Claims, 7 Drawing Sheets

(56) References Cited

FOREIGN PATENT DOCUMENTS

| | | | | | |
|---|---|---|---|---|---|
| JP | 2021062514 | A | * | 4/2021 | |
| JP | 2021062518 | A | * | 4/2021 | |
| WO | WO 2018/105016 | A1 | | 6/2018 | |
| WO | WO-2019225002 | A1 | * | 11/2019 | .......... B41F 15/0836 |
| WO | WO-2022224430 | A1 | * | 10/2022 | .......... B41F 15/0881 |

* cited by examiner

ACCOMMODATING RACK, REPLACEMENT FRAME, RACK SYSTEM, AND PRINTING DEVICE

TECHNICAL FIELD

The present description discloses an accommodating rack, a replacement frame, a rack system, and a printing device.

BACKGROUND ART

Conventionally, for example, in a printing device that performs printing process of viscous fluid on a printing object such as a board using a screen mask, a device that automatically replaces a replacement member has been proposed (for example, see Patent Literature 1). With this printing device, since the replacement member can automatically be replaced, the load of a worker can be reduced much.

PATENT LITERATURE

Patent Literature 1: International Publication 2018/105016

BRIEF SUMMARY

Technical Problem

Here, in the above-described printing device, automatic replacement is performed with the replacement member supported by the replacement frame, but it is also assumed that a worker pulls out the replacement frame and manually replaces the replacement member. In such a case, when the replacement frame is pulled out, for example, in a case where the replacement member is a heavy object, if the replacement frame is pulled out too much, the replacement frame may fall.

The present disclosure has been made in view of such a problem, and a main object of the present disclosure is to provide an accommodating rack, a replacement frame, a rack system, and a printing device that can achieve more safety when replacing a replacement member used in the printing device.

Solution to Problem

An accommodating rack, a replacement frame, a rack system, and a printing device disclosed in the present description employ the following means in order to achieve the main object described above.

According to an aspect of the present disclosure, there is provided an accommodating rack used in a printing device including a printing section configured to perform a printing process of viscous fluid on a processing object using a screen mask and accommodating a replacement frame in a shelf shape, the replacement frame including a support portion configured to support a replacement member used in the printing device and a frame-side stopper, the accommodating rack including:

- an accommodating section configured to accommodate the replacement frame;
- a guide section configured to support the replacement frame and guide the replacement frame between the accommodating section and an outside; and
- a rack-side stopper protruding toward an inside of the frame from a reference outer surface of the replacement frame and engaging with the frame-side stopper to restrict removal of the replacement frame in a pulled-out state in which the replacement frame is pulled out from the accommodating rack.

In this accommodating rack, the frame-side stopper and the rack-side stopper are engaged with each other, and removal of the replacement frame supporting the replacement member is restricted in the pulled-out state. In this accommodating rack, it is possible to prevent the replacement frame from falling and the like, and it is possible to further enhance safety.

DESCRIPTION OF EMBODIMENTS

Figure 1:
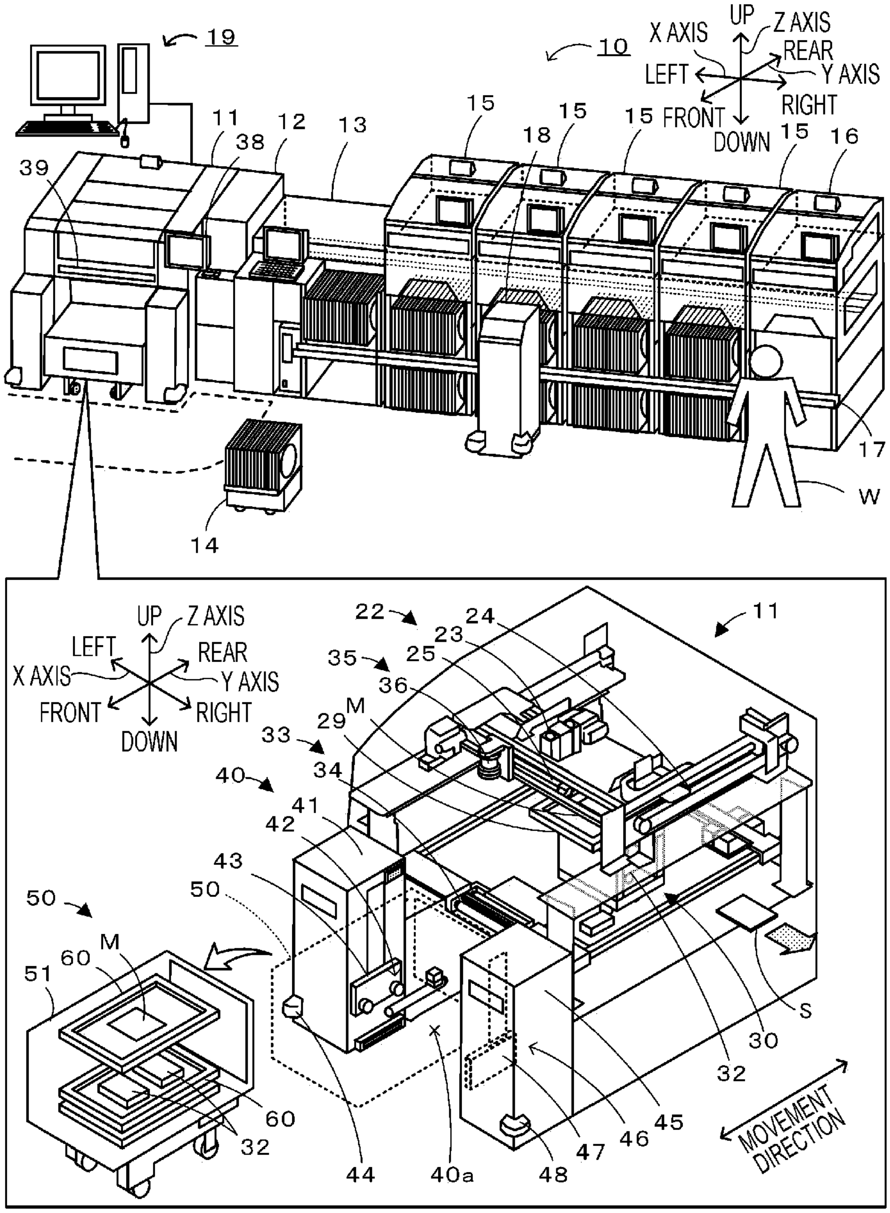
FIG. 1 is a schematic view illustrating an example of mounting system 10 and printing device 11.
Figure 2:
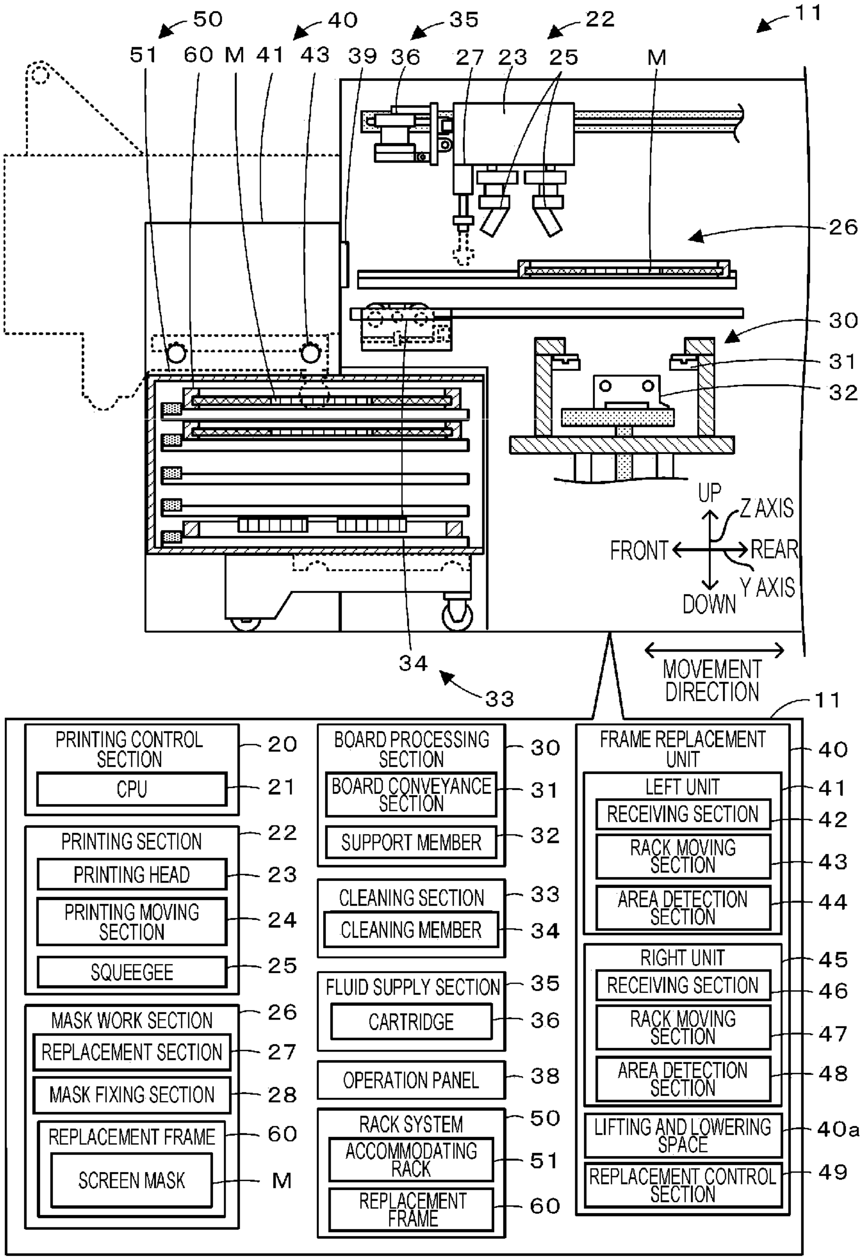
FIG. 2 is a view illustrating an example of printing device 11 and rack system 50.
Figure 3:
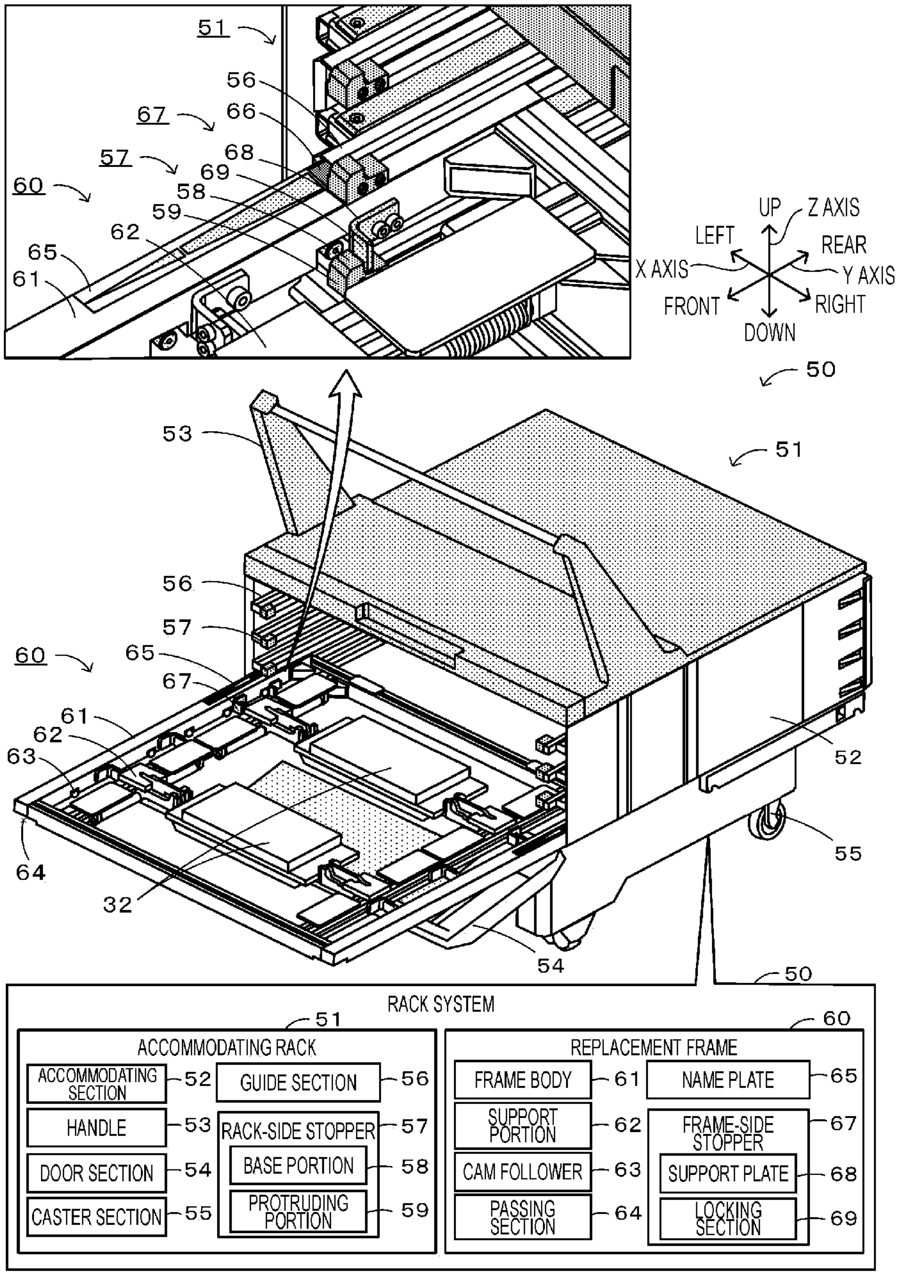
FIG. 3 is a schematic view of rack system 50.
Figure 4:
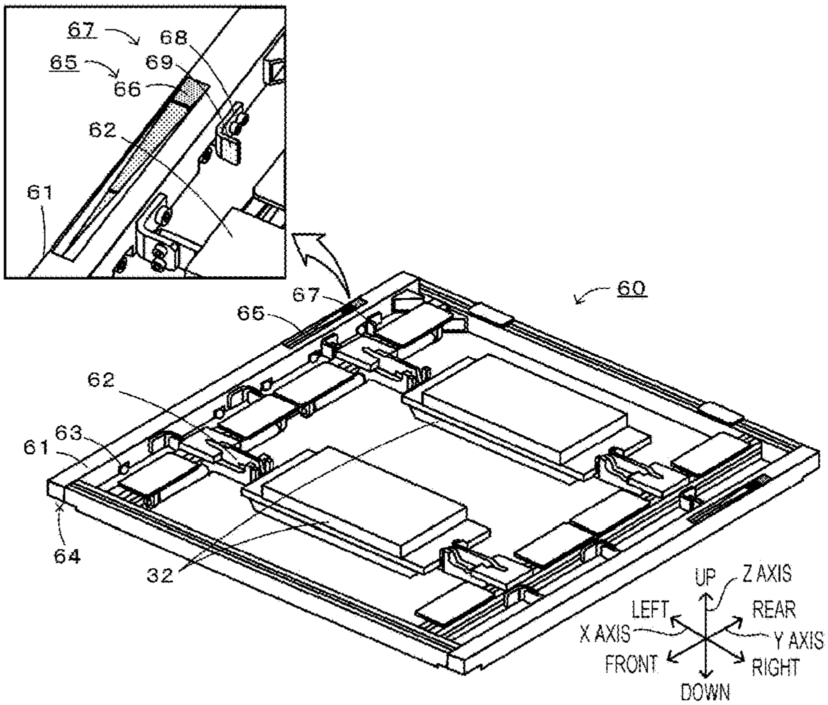
FIG. 4 is a view illustrating an example of replacement frame 60.
Figure 5:
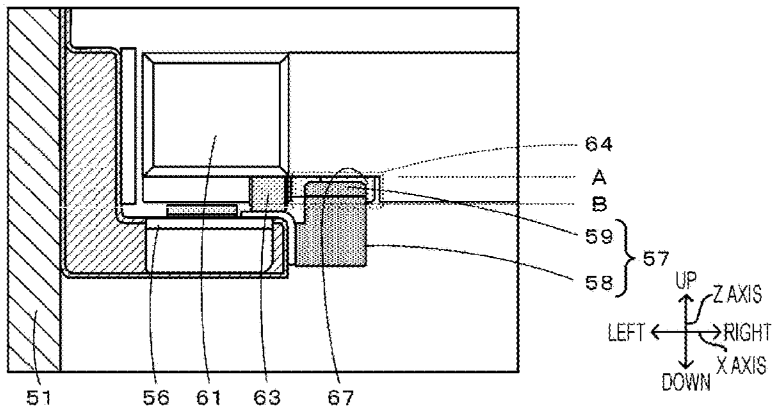
FIG. 5 is a view of guide section 56 and replacement frame 60 as viewed from the front.
Figure 6:
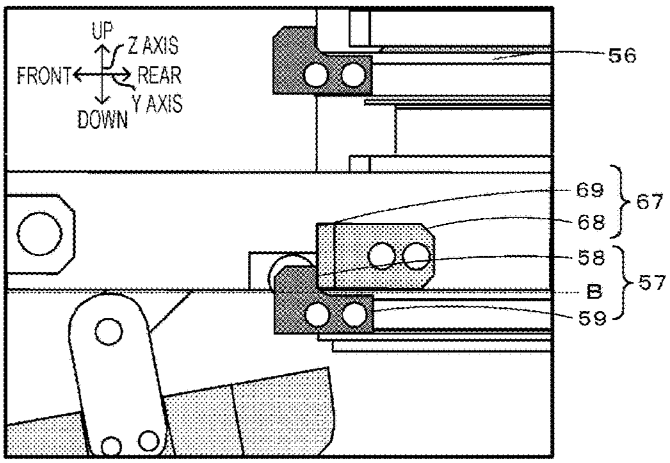
FIG. 6 is a view of guide section 56 and replacement frame 60 as viewed from the side.
Figure 7:
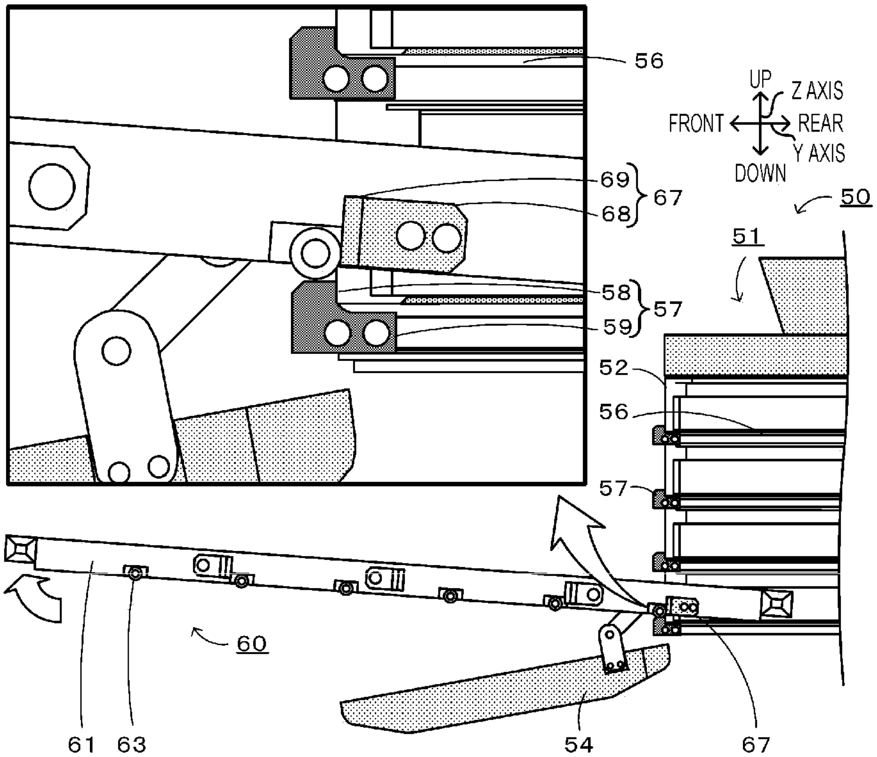
FIG. 7 is a view illustrating an example when replacement frame 60 is removed.
Figure 8:
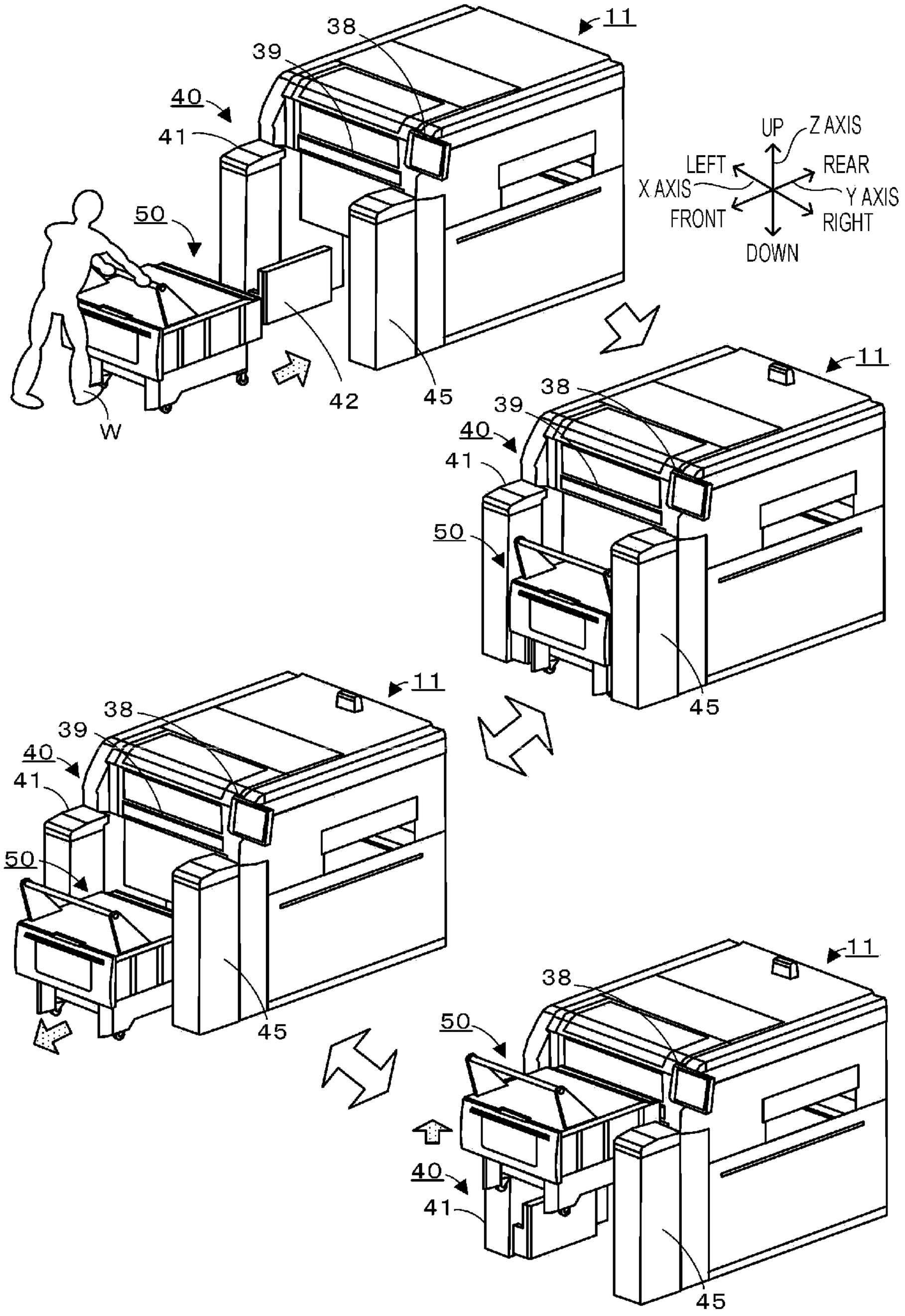
FIG. 8 is a view illustrating a receipt of accommodating rack 51 and movement thereof between a standby position and a replacement position.

The present embodiment of the present disclosure will be described with reference to the drawings. FIG. 1 is a schematic view illustrating an example of mounting system 10 and printing device 11 according to the present disclosure. FIG. 2 is a view illustrating an example of printing device 11 and rack system 50. FIG. 3 is a schematic view of rack system 50 including accommodating rack 51 and replacement frame 60. FIG. 4 is a view illustrating an example of replacement frame 60. FIG. 5 is a view of guide section 56 and replacement frame 60 as viewed from the front. FIG. 6 is a view of guide section 56 and replacement frame 60 viewed from the side. FIG. 7 is a view illustrating an example when replacement frame 60 is removed. FIG. 8 is a view illustrating that receiving section 42 receives accommodating rack 51 and moves between a standby position and a replacement position. In the present embodiment, a left-right direction (X axis), a front-rear direction (Y axis), and an up-down direction (Z axis) are as illustrated in FIGS. 1 to 8.

Mounting system 10 includes printing device 11, print inspection device 12, storage device 13, automatic conveyance vehicle 14, mounting device 15, mounting inspection device 16, loader 18, a reflow device (not illustrated), and management computer (PC) 19. Mounting system 10 is configured as, for example, a production line in which mounting devices 15 for performing a mounting process of mounting component P on board S as a processing object are aligned in a conveyance direction of board S on a downstream side of printing device 11. In mounting system 10, a mounting-related device which are involved in the mounting process includes a conveyance device for conveying board S, printing device 11, print inspection device 12, storage device 13, mounting device 15, mounting inspection device 16, loader 18, the reflow device, and the like.

Print inspection device 12 is a device that inspects the state of viscous fluid such as solder paste which is printed on board S by printing device 11. Storage device 13 is a temporary storage place of a feeder holding component P. Automatic conveyance vehicle 14 is a device that automatically conveys a feeder between a preparation warehouse (not illustrated) and storage device 13. Mounting device 15 is a device that executes a mounting process of arranging component P on board S. Mounting inspection device 16 is a device that inspects the state or the like of component P mounted on board S. Loader 18 is configured as a movable working device, and is a device that moves in the left-right direction along X-axis rails 17 on the front side of mounting device 15 to automatically attach and detach a mounting-related member such as a feeder used in mounting device 15, and collects and supplies the mounting-related member. The reflow device is a device that reflows a board which is printed with a solder and mounted with component P. Management PC 19 is a device for managing information on each device of mounting system 10. Management PC 19 manages a progress status of each of the devices of the production line which are involved in the mounting process.

As illustrated in FIGS. 1 and 2, printing device 11 is a device for pushing a solder on screen mask M into a pattern hole formed in screen mask M using squeegees 25 to thereby apply (print) solder, as viscous fluid, onto board S, which is a processing object, below screen mask M through the pattern hole. Here, as the "processing object", there are raised board S on which component P is mounted, a base material which is a three-dimensional object, and the like. As the "viscous fluid", there are raised solder paste, conductive paste, an adhesive, and the like. Here, the following description will be made using board S and solder paste as examples. Screen mask M is fixed inside replacement frame 60. Replacement frame 60 can fix replacement members such as screen mask M and support member 32 of several sizes, and has a size that can be accommodated in accommodating section 52 of accommodating rack 51. Printing device 11 includes, as illustrated in FIG. 2, printing control section 20, printing section 22, mask work section 26, board processing section 30, cleaning section 33, fluid supply section 35, operation panel 38, replacement unit 40, and rack system 50.

Printing control section 20 is configured as a microprocessor which is made up mainly of CPU 21 and controls the whole of printing device 11. Printing control section 20 outputs a signal to management PC 19 as an external device in addition to printing section 22, mask work section 26, board processing section 30, cleaning section 33, fluid supply section 35, operation panel 38, and replacement unit 40. In addition, printing control section 20 receives a signal from management PC 19, which is the external device, as an input therefrom in addition to printing section 22, mask work section 26, board processing section 30, cleaning section 33, fluid supply section 35, operation panel 38, and replacement unit 40. Printing control section 20 has a storage section that stores information on board S on which a printing process is executed, a printing process program for executing a printing process on board S, a replacement process program for causing replacement section 27 to execute a replacement process of the replacement member, and the like.

Printing section 22 is a unit that is disposed at an upper stage of printing device 11 and executes a printing process to print viscous fluid on board S using screen mask M. Printing section 22 includes, as illustrated in FIGS. 1 and 2, printing head 23, printing moving section 24, a squeegee lifting and lowering section (not illustrated), and squeegees 25. Printing moving section 24 is configured to move printing head 23 in a predetermined printing direction (here, in the front-rear direction) and includes a guide formed in the front-rear direction, a slider configured to move along the guide, and a motor for driving the slider. Squeegee 25 is disposed on a lower surface side of printing head 23 and is lifted and lowered by the squeegee lifting and lowering section. Printing section 22 has two squeegees 25 which are individually used in the front-rear direction. Mask work section 26 is a unit that is disposed between printing section 22 and board processing section 30 in the up-down direction as illustrated in FIG. 2 and that fixes and holds screen mask M. Mask work section 26 includes replacement section 27 and mask fixing section 28. Replacement section 27 is used to pull replacement frame 60 from accommodating rack 51 into the housing of printing device 11 and to push replacement frame 60 from the housing of printing device 11 to accommodating rack 51. Replacement section 27 is a conveyance rod provided in printing head 23, and is lifted and lowered between an abutment position (dotted line) where replacement section 27 abuts on screen mask M by an air cylinder (not illustrated) and a standby position (solid line). Printing head 23 and replacement section 27 are engaged with replacement frame 60 between a shelf portion at a predetermined height of accommodating rack 51 and printing section 22 to move replacement frame 60. Mask fixing section 28 positions screen mask M, and supports and fixes screen mask M in a horizontal posture. Screen mask M is pushed to move along the guide of mask work section 26 in the front-rear direction by replacement section 27 and is fixed by mask fixing section 28. Replacement frame 60 moves in and out of the housing through passage opening 39 provided in the middle of the front surface of the housing of printing device 11 (see FIG. 2).

Board processing section 30 is a unit that is disposed below mask work section 26 and that conveys in board S, positions and supports conveyed-in board S, and causes board S to come into contact with and separate from screen mask M. Board processing section 30 includes board conveyance section 31 that conveys board S in the left-right direction, support member 32 that is a backup plate that supports board S from below, and a lifting and lowering section that lifts and lowers the entire board processing section 30 or support member 32. Support member 32 is a flat plate-shaped member, and is automatically replaced by replacement section 27 or the like according to the type of board S. The replacement process of support member 32 is performed as follows, for example. After introducing empty replacement frame 60 into mask work section 26 by replacement section 27, printing control section 20 lifts the mounting section on which support member 32 is mounted by the lifting and lowering section and transfers support member 32 to replacement frame 60. Similarly, printing control section 20 introduces replacement frame 60, to which next support member 32 is fixed, into mask work section 26 by replacement section 27, and then lifts the empty mounting section by the lifting and lowering section to mount support member 32 on the mounting section.

Cleaning section 33 is a unit that is disposed between mask work section 26 and board processing section 30 in the up-down direction and that executes a cleaning process of cleaning a rear surface of screen mask M. Cleaning section 33 has cleaning member 34, and screen mask M is cleaned as a result of cleaning member 34 being brought into abutment therewith. Fluid supply section 35 is a unit that supplies solder accommodated in cartridge 36 on to screen mask M. Fluid supply section 35 is disposed ahead of printing head 23. Fluid supply section 35 applies a pressure to cartridge 36 so as to discharge solder from cartridge 36. Cleaning member 34 and cartridge 36 are consumable supplies and are replacement members that are replaced as necessary. Operation panel 38 is a unit that receives an input from worker W and presents information to worker W. This operation panel 38 includes a display section, which is a display, and an operation section of a touch panel type having a button.

Replacement unit 40 is a unit that automatically replaces the replacement member by moving accommodating rack 51 accommodating the replacement member used in printing device 11 between the standby position and the replacement position. Replacement unit 40 is a unit that includes a belt driving device (not illustrated) and that inserts the belt driving device into groove portions formed on the left and right sides of accommodating section 52 of accommodating rack 51 to carry replacement frame 60 into and out of accommodating section 52. Replacement unit 40 is configured as a device that receives accommodating rack 51 accommodating replacement members such as screen mask M and support member 32 fixed to replacement frame 60 and moves accommodating rack 51 back and forth and up and down. Replacement unit 40 has left unit 41 and right unit 45. Replacement unit 40 has lifting and lowering space 40*a* defined in the center between left unit 41 and right unit 45 for lifting and lowering accommodating rack 51. Left unit 41 is disposed at a front left side of the housing of printing device 11. Left unit 41 includes receiving section 42, rack moving section 43, and area detection section 44. Receiving section 42 is a portion that receives accommodating rack 51 so that accommodating rack 51 can be lifted and lowered. Rack moving section 43 is a device that engages with accommodating rack 51, moves accommodating rack 51 back and forth when accommodating rack 51 is grounded, and lifts and lowers accommodating rack 51 when the replacement member is replaced. Area detection section 44 is a sensor for detecting an object existing on a circumference of left unit 41. For example, a laser scanner, an infrared ray sensor, or the like can be used as area detection section 44. Receiving section 46, rack moving section 47, and area detection section 48 of right unit 45 have the same configurations as those of receiving section 42, rack moving section 43, and area detection section 44, and the description thereof will be omitted. Replacement unit 40 includes, for example, an opening/closing detection section (not illustrated) that detects an opening/closing state of door section 54 of accommodating rack 51. Replacement unit 40 has replacement control section 49. Replacement control section 49 is configured as a microprocessor mainly including CPU, and controls the whole of replacement unit 40. Replacement control section 49 outputs a control signal to rack moving sections 43 and 47, and acquires a detection signal from area detection sections 44 and 48 and the opening/closing detection section.

Rack system 50 includes accommodating rack 51 and replacement frame 60. As illustrated in FIGS. 1 to 3, accommodating rack 51 is a movable accommodating and conveying device that accommodates replacement frame 60 in a shelf shape. Accommodating rack 51 only accommodates replacement frame 60, and does not include a power source such as a drive section that moves replacement frame 60 and a drive section that lifts and lowers replacement frame 60. With accommodating rack 51, the configuration can be further simplified. Accommodating rack 51 includes accommodating section 52, handle 53, door section 54, caster section 55, guide section 56, and rack-side stopper 57. Accommodating section 52 is a box body having multiple stages of guide sections 56 disposed therein and two opening portions. One opening portion is opened and closed by door section 54. Handle 53 is fixed to an upper portion of accommodating section 52. Handle 53 is made up of a rod-shaped member gripped by worker W and a fixing member that fixes the rod-shaped member. Door section 54 is a plate-shaped member that opens and closes the rear portion (the front portion in FIG. 2) of accommodating section 52. The lower end side of door section 54 is hinge-fixed, and the upper end swings downward to open the opening portion (see FIGS. 3 and 6). Caster section 55 is disposed in a lower part of accommodating section 52. Caster section 55 is made up of a structure having a space in the center thereof and casters which are disposed on a lower surface side of the structure and which each have a wheel. Worker W can move accommodating rack 51 with holding handle 53, and automatic conveyance vehicle 14 can move while being located in the central space in a lower part thereof.

Guide section 56 is a member that supports replacement frame 60 and guides replacement frame 60 between accommodating section 52 and the outside. Guide section 56 is a member formed in a rectangular columnar shape elongated in the front-rear direction of accommodating section 52. Guide section 56 has a traveling surface on which cam follower 63 disposed in replacement frame 60 moves while rotating (see FIG. 5 and the like). Guide sections 56 are arranged in multiple stages on the left and right inside accommodating section 52, and are arranged at predetermined intervals in the up-down direction so that replacement frame 60 can be placed in the up-down direction. Replacement frame 60 is inserted between guide section 56 and upper guide section 56 to serve as a shelf portion. Guide section 56 supports the lower surface side of replacement frame 60 on the upper surface side thereof, and supports the upper surface of the end portion of replacement frame 60 on the lower surface side thereof when lower replacement frame 60 is pulled out (see FIG. 3). As illustrated in FIG. 5, guide section 56 may include a combination of multiple members, for example, a combination of a plate member having a stepped cross section, a plate member having an L-shaped cross section and a plate fixed to the upper surface of the stepped cross section, and a member of the traveling surface of cam follower 63. Alternatively, guide section 56 may be integrally molded.

Rack-side stopper 57 is a member that engages with frame-side stopper 67 disposed in replacement frame 60 and restricts removal of replacement frame 60 in a pulled-out state in which replacement frame 60 is pulled out from accommodating rack 51. Rack-side stoppers 57 are disposed on the distal end sides of the opening portions of left and right guide sections 56. Rack-side stopper 57 includes base portion 58 and protruding portion 59. Base portion 58 is a portion fixed to a side surface of guide section 56. As illustrated in FIGS. 5 and 6, protruding portion 59 protrudes toward the inside of the frame, that is, upward from reference outer surface B of replacement frame 60, and engages with frame-side stopper 67. In replacement frame 60, reference outer surface B is the lower surface side of frame body 61. Reference outer surface B is, for example, an outer surface occupying most of replacement frame 60 as a three-dimensional object. As illustrated in FIG. 6, protruding portion 59 has an abutment surface on which rack-side stopper 57 abuts and an inclined surface inclined to the front side. As illustrated in FIG. 7, protruding portion 59 is formed to have such a height that, when replacement frame 60 is in the pulled-out state of being pulled out from accommodating section 52 and the end portion on the outer side thereof is lifted, frame-side stopper 67 passes over protruding portion 59 and the restriction of the movement is released. Since protruding portion 59 has the inclined surface, when protruding portion 59 releases the restriction of the removal, frame-side stopper 67 easily passes thereabove. Further, protruding portion 59 can reliably stop frame-side stopper 67 by the abutment surface. Rack-side stopper 57 is fixed to guide section 56 by screws, and can be easily removed from guide section 56 by removing the screws.

Replacement frame 60 is a frame body that supports a replacement member used in printing device 11, and is a member that is accommodated in accommodating rack 51 including rack-side stopper 57. Screen mask M as the replacement member is fixed to mask work section 26 while being fixed to replacement frame 60, and is used for the printing process. Support member 32 serving as the replacement member is replaced via replacement frame 60, removed from replacement frame 60, or attached to replacement frame 60 to move. Replacement frame 60 is accommodated in accommodating section 52, and forms a shelf portion in a state where the end portion is supported on the upper portion of guide section 56. As illustrated in FIG. 4, replacement frame 60 includes frame body 61, support portion 62, cam follower 63, passing section 64, name plate 65, and frame-side stopper 67.

Frame body 61 has a structure in which columnar members having a rectangular cross section are assembled to four sides, and a support space is formed at the center. Support portion 62 is a member that is disposed toward the inside of frame body 61 and supports a replacement member used in printing device 11. FIG. 4 illustrates an example in which support portion 62 supports each of two support members 32. Support portion 62 releases the fixation of support member 32 when fixed support member 32 is pushed up from below, and fixes support member 32 when support member 32 is inserted from below in an empty state. Cam follower 63 is a circular plate-shaped member rotatably supported on the inner side and the lower surface side of frame body 61, and is guided in the front-rear direction on the traveling surface of guide section 56 to rotate. Frame body 61 is supported by guide section 56 or the like via cam follower 63. Passing section 64 is a space that is cut out toward the frame inner side from reference outer surface B of replacement frame 60, and is a space through which rack-side stopper 57 passes as replacement frame 60 moves (see FIG. 5). Passing section 64 is a space formed between passage surface A formed by cutting out frame body 61 and reference outer surface B. Passing section 64 is formed on the lower surface side of replacement frame 60. Name plate 65 is formed with an indicator for visually checking how much replacement frame 60 is pulled out from accommodating section 52 when replacement frame 60 is pulled out from accommodating section 52. Name plate 65 has caution area 66 formed at a position where it can be pulled out to the maximum. Name plate 65 has, for example, different colors in accordance with the amount of the pulled out. For example, name plate 65 may be colored such that the front side is green, the center is yellow, and caution area 66 at the rear end is red. Further, name plate 65 may have a shape in which the front side is thinner and the rear end side is thicker (see FIG. 4).

Frame-side stopper 67 is a member that engages with rack-side stopper 57 and restricts removal of replacement frame 60 in the pulled-out state in which replacement frame 60 is pulled out from accommodating rack 51. Frame-side stoppers 67 are disposed one on each of the left and right on the rear side of frame body 61. When replacement frame 60 is pulled out, frame-side stopper 67 empirically obtains a position where replacement frame 60 does not fall based on the weight of supporting support member 32 and the weight of frame body 61, and the disposition position is set based on this position. Frame-side stopper 67 protrudes between passage surface A and reference outer surface B, does not protrude from reference outer surface B, and is disposed in the space of passing section 64 (see FIG. 5). Therefore, frame-side stopper 67 is unlikely to be caught by other structures when replacement frame 60 moves. Frame-side stopper 67 is an L-shaped member disposed on the inner surface of replacement frame 60, and includes support plate 68 and locking section 69 (see FIG. 3). Support plate 68 is a portion disposed on frame body 61 and is a plate-shaped portion along the inner surface of frame body 61. Locking section 69 is a portion that is continuously connected to support plate 68, and is a plate-shaped portion that is disposed substantially perpendicular to the inner surface of frame body 61. Locking section 69 abuts on the abutment surface of protruding portion 59 of rack-side stopper 57 to restrict the movement of replacement frame 60. In frame-side stopper 67, locking section 69 abutting on rack-side stopper 57 is located on the front side, support plate 68 fixes locking section 69 on the rear side thereof, and thus, removal of replacement frame 60, which is a relatively heavy object, can be more reliably restricted. Further, since locking section 69 is relatively thin in the front-rear direction, locking section 69 easily passes above protruding portion 59 when replacement frame 60 is removed as illustrated in FIG. 7. Frame-side stopper 67 is fixed to frame body 61 by screws, and can be easily removed from frame body 61 by removing the screws.

Next, a printing process of printing device 11 configured in the way described heretofore will briefly be described. When executing the printing process, worker W performs work of accommodating replacement frame 60 in accommodating rack 51, moving accommodating rack 51 to replacement unit 40 (first topmost in FIG. 8), and receiving accommodating rack 51 in replacement unit 40 (second topmost in FIG. 8). After replacement unit 40 receives accommodating rack 51, worker W inputs the execution of the printing process from operation panel 38. When an execution command of the printing process is input from worker W, CPU 21 of printing control section 20 starts the printing process routine. First, CPU 21 conveys and fixes board S by board processing section 30, lifts support member 32 to support board S from below, and lifts entire board S to bring board S into abutment with screen mask M. For this, CPU 21 causes mask work section 26 to adjust the position of screen mask M to thereby perform a position alignment between a pattern hole and board S.

Next, CPU 21 causes cartridge 36 to discharge the solder onto screen mask M, moves printing head 23, lowers squeegee 25 to bring squeegee 25 into abutment with the upper surface of screen mask M, and moves squeegee 25 in the front-rear direction to print the solder on board S. In addition, when the use of screen mask M is completed, CPU 21 executes a process of replacing screen mask M with subsequent screen mask M. First, using replacement unit 40, CPU 21 pulls out accommodating rack 51 from the standby position where accommodating rack 51 is pulled into the housing of printing device 11 to the lifting enabling position (a third topmost in FIG. 8) and lifts up accommodating rack 51 to the replacement position (a fourth topmost in FIG. 8). Then, CPU 21 causes replacement section 27 to replace screen masks M and causes rack moving section 43 to move accommodating rack 51 to the standby position when the replacement is completed.

CPU 21 also replaces support member 32 as necessary. When accommodating rack 51 is at the standby position, worker W performs work of opening door section 54, pulling out replacement frame 60, taking out used support member 32, and supporting next support member 32. At this time, when the heavy object is supported only on the distal end side, replacement frame 60 may fall, and thus CPU 21 may notify worker W by operation panel 38 to remove the heavy object from support member 32 on the front side. In accommodating rack 51, when replacement frame 60 is pulled out from accommodating section 52, worker W can check name plate 65 and perform adjustment so as not to pull out replacement frame 60 too much. Replacement frame 60 is stopped at a position where replacement frame 60 does not fall by rack-side stopper 57 and frame-side stopper 67. In this case, the lower surface side of replacement frame 60 is supported by the upper surface of guide section 56, and the upper surface side of replacement frame 60 is supported by the lower surface of guide section 56 which is one step higher, and is stabilized (see FIG. 3). When replacement frame 60 is prepared, CPU 21 moves accommodating rack 51 to the replacement position, moves empty replacement frame 60 to mask work section 26, and collects support member 32 mounted on board processing section 30. Further, CPU 21 moves replacement frame 60 supporting next support member 32 to mask work section 26 and mounts support member 32 on the mounting section. CPU 21 repeatedly performs the printing process while replacing screen masks M and support member 32 until the production process of all the types of boards S in the production plan is completed.

Figure 9:
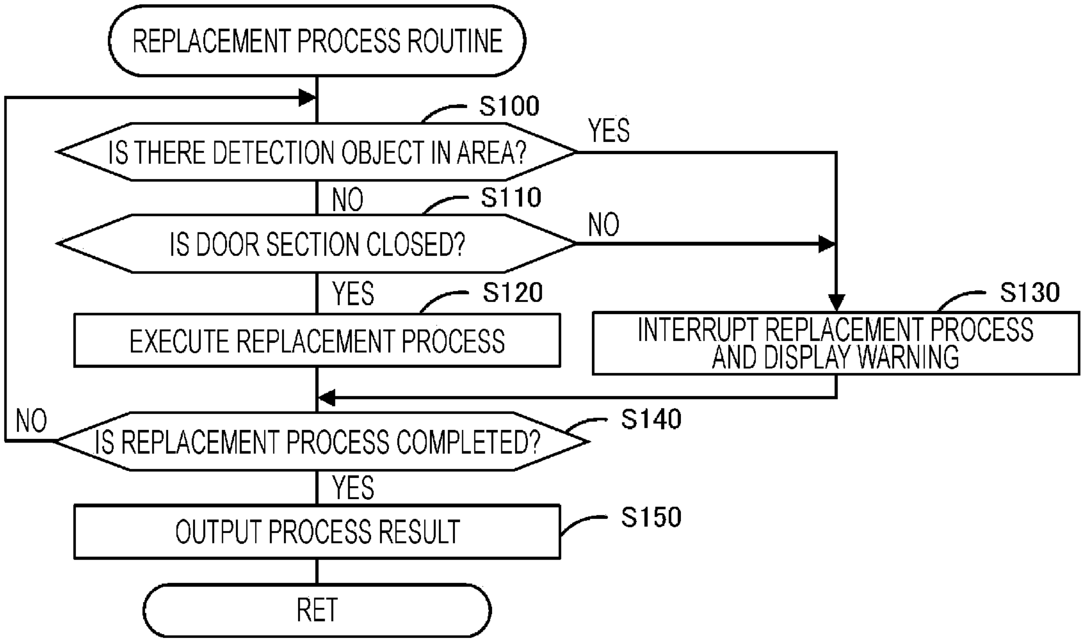
FIG. 9 is a flowchart illustrating an example of a replacement process routine.

Next, a specific process of securing safety in replacing printing-related members by moving accommodating rack 51 in replacement unit 40 will be described. FIG. 9 is a flowchart illustrating an example of a replacement process routine executed by replacement control section 49. This routine is stored in the storage section of replacement control section 49 and executed when the replacement member is replaced. When this routine is executed, the CPU of replacement control section 49 determines whether there is a detection object in the surrounding area (see the dotted line in FIG. 1) of printing device 11 based on the signals from area detection sections 44 and 48 (S100). When there is no detection object in the surrounding area, the CPU determines whether door section 54 is closed based on a signal from the opening/closing detection section (S110). When door section 54 is closed, the CPU executes the replacement process of the replacement member (S120). Note that the replacement process executes the above-described process, and detailed description thereof is omitted. Meanwhile, when there is the detection object in the surrounding area in S100, or when door section 54 is opened in S110, the CPU interrupts the replacement process and displays a warning to that effect on operation panel 38 (S130). After S130 or S120, the CPU of replacement control section 49 determines whether the replacement process is completed (S140), and when the replacement process is not completed, executes the process of S100 and thereafter. Meanwhile, when the replacement process is completed in S140, the result of the replacement process is output to printing device 11 (S150), and this routine is ended. In printing device 11, for example, when door section 54 is manually opened and replacement frame 60 is pulled out, the replacement process is interrupted, and safety can be further ensured. In addition, in printing device 11, in the replacement of the replacement member by pulling out replacement frame 60 by worker W, replacement frame 60 is prevented from falling by each mechanism of rack system 50, and the replacement work can be safely executed.

Here, a correspondence relationship between the elements of the present embodiment and the elements of the present disclosure will be clarified. Accommodating rack 51 of the present embodiment corresponds to an accommodating rack of the present disclosure, accommodating section 52 corresponds to an accommodating section, guide section 56 corresponds to a guide section, reference outer surface B corresponds to a reference outer surface, rack-side stopper 57 corresponds to a rack-side stopper, and protruding portion 59 corresponds to a protruding portion. Replacement frame 60 corresponds to the replacement frame, support portion 62 corresponds to the support portion, passing section 64 corresponds to the passing section, and frame-side stopper 67 corresponds to the frame-side stopper. Board S corresponds to a processing object, screen mask M corresponds to a screen mask, rack system 50 corresponds to a rack system, printing section 22 corresponds to a printing section, rack moving sections 43 and 47 and replacement section 27 correspond to replacement sections, and printing device 11 corresponds to a printing device.

Accommodating rack 51 of the present embodiment described above includes accommodating section 52 that accommodates replacement frame 60, guide section 56 that supports replacement frame 60 and guides replacement frame 60 between accommodating section 52 and the outside, and rack-side stopper 57 that protrudes toward the inner side of the frame from reference outer surface B of replacement frame 60 and engages with frame-side stopper 67 to restrict the removal of replacement frame 60 in the pulled-out state in which replacement frame 60 is pulled out from accommodating rack 51. In accommodating rack 51, frame-side stopper 67 and rack-side stopper 57 are engaged with each other, and the removal of replacement frame 60 supporting support member 32 as a replacement member is restricted in the pulled-out state. In accommodating rack 51, it is possible to prevent replacement frame 60 from falling and the like, and it is possible to further enhance safety.

Rack-side stopper 57 is disposed on the distal end side of the opening portion of guide section 56 and has protruding portion 59 that protrudes upward to engage with frame-side stopper 67. In accommodating rack 51, since rack-side stopper 57 engages with frame-side stopper 67 on the distal end side, replacement frame 60 can be sufficiently pulled out. Further, since accommodating rack 51 is engaged with frame-side stopper 67 by protruding portion 59 protruding upward, the removal of replacement frame 60 can be more reliably restricted. Further, rack-side stopper 57 is formed with protruding portion 59 at a height at which frame-side stopper 67 passes over protruding portion 59 and the restriction of the movement is released when replacement frame 60 is in the pulled-out state and the end portion on the outer side is lifted. In accommodating rack 51, the movement restriction of replacement frame 60 can be released and replacement frame 60 can be removed by a simple work of lifting up the end portion of replacement frame 60. Furthermore, guide sections 56 are arranged in multiple stages, support the lower surface side of replacement frame 60 on the upper surface side thereof, and support the end portion upper surface of replacement frame 60 of the lower stage on the lower surface side of the upper stage. In accommodating rack 51, replacement frame 60 that has been pulled out can be supported by upper and lower guide sections 56.

Replacement frame 60 includes support portion 62 that supports a replacement member used in printing device 11, passing section 64 which is cut out on a frame inner side from reference outer surface B of replacement frame 60 and through which rack-side stopper 57 passes as replacement frame 60 moves, and frame-side stopper 67 that protrudes between passing section 64 and reference outer surface B and engages with rack-side stopper 57 to restrict removal of replacement frame 60 in a pulled-out state in which replacement frame 60 is pulled out from the accommodating rack. In replacement frame 60, the frame-side stopper and the rack-side stopper are engaged with each other, and the removal of the replacement frame supporting the replacement member is restricted in the pulled-out state. In accommodating rack 51, it is possible to prevent replacement frame 60 from falling and the like, and it is possible to further enhance safety. In replacement frame 60, since passing section 64 through which rack-side stopper 57 passes is formed and frame-side stopper 67 does not protrude from reference outer surface B, frame-side stopper 67 is less likely to be caught by other members, and replacement frame 60 can be pulled out smoothly. Further, passing section 64 is formed on the lower surface side of replacement frame 60, and frame-side stopper 67 is an L-shaped member disposed on the inner surface of replacement frame 60. In replacement frame 60, the movement of replacement frame 60 can be more reliably restricted on the lower surface side by using frame-side stopper 67 having a simpler structure.

Rack system 50 includes accommodating rack 51 and replacement frame 60 described above. In rack system 50, frame-side stopper 67 and rack-side stopper 57 are engaged with each other, and replacement frame 60 supporting the replacement member is restricted from being removed in the pulled-out state. In rack system 50, it is possible to prevent replacement frame 60 from falling and the like, and it is possible to further enhance safety. In rack system 50, at least one of rack-side stopper 57 and frame-side stopper 67 is disposed to be removable. In rack system 50, since the movement restriction is released by removing any one of the stoppers, replacement frame 60 can be easily used for automatic replacement of replacement frame 60 by automatic conveyance vehicle 14 or the like.

In addition, printing device 11 includes printing section 22 that performs the printing process on board S as the processing object using the solder paste as the viscous fluid by using screen mask M, rack system 50 described above, and rack moving sections 43 and 47 and replacement section 27 as the replacement sections that move accommodating rack 51 between the replacement position and the standby position and pull replacement frame 60 into the housing to replace the replacement member. Printing device 11 includes rack system 50 in which frame-side stopper 67 and rack-side stopper 57 are engaged with each other, and removal of replacement frame 60 supporting the replacement member is restricted in a pulled-out state. In printing device 11, it is possible to prevent replacement frame 60 from falling and to further enhance safety.

The accommodating rack, the replacement frame, the rack system, and the printing device of the present disclosure are not limited to the above-described embodiments, and may be implemented in various modes as long as they belong to the technical scope of the present disclosure.

Figure 10:
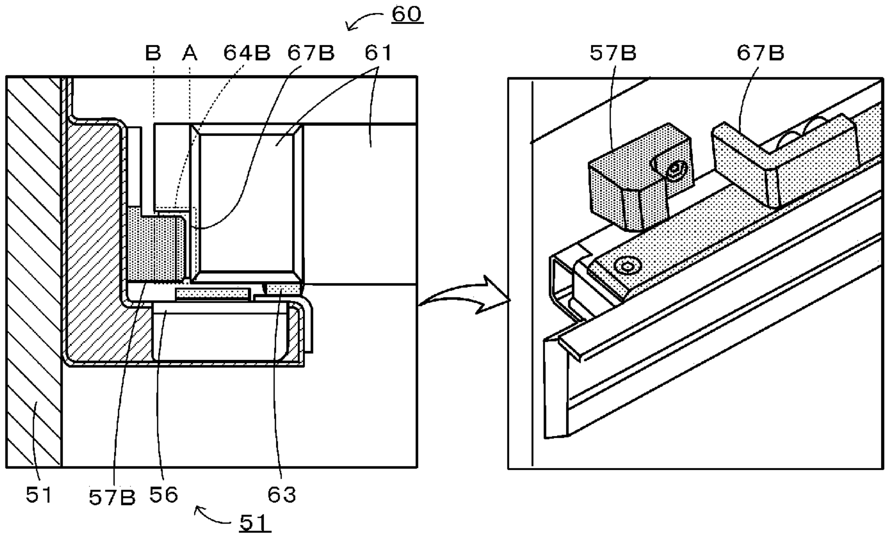
FIG. 10 is a view illustrating an example of another rack-side stopper 57B and another frame-side stopper 67B.

For example, in the above-described embodiment, although rack-side stopper 57 has protruding portion 59 protruding upward, protruding portion 59 is not particularly limited thereto as long as rack-side stopper 57 engages with frame-side stopper 67. Although rack-side stopper 57 is fixed to the side surface of guide section 56, rack-side stopper 57 is not particularly limited thereto as long as rack-side stopper 57 engages with frame-side stopper 67. Further, although passing section 64 is formed on the lower surface side of replacement frame 60, passing section 64 is not particularly limited thereto as long as rack-side stopper 57 passes therethrough. FIG. 10 is a view illustrating another example of rack-side stopper 57B and frame-side stopper 67B. In rack system 50, rack-side stopper 57B is fixed to the wall surface side of accommodating rack 51, and protruding portion 59 protrudes in a vertical direction of the wall surface. Further, passing section 64B is formed on the side surface side of replacement frame 60, and frame-side stopper 67B is fixed to frame body 61 in a state of not protruding from reference outer surface B as the side surface. Even when the directions of the engaging members are freely changed as in rack-side stopper 57B and frame-side stopper 67B, the same effect as that of rack system 50 described above can be achieved as long as the engaging members are engaged with each other. Similarly, when rack-side stopper 57 passes, the formation direction of passing section 64 can be appropriately changed in accordance with the protruding direction of rack-side stopper 57.

In the above-described embodiment, accommodating rack 51 includes the multiple stages of guide sections 56; however, the configuration is not limited to this, accommodating rack 51 may include single-stage guide section 56. In this case, the upper surface side of replacement frame 60 need only be supported by a member other than guide section 56. It should be noted that it is preferable that accommodating section 52 has multiple stages of guide sections 56 because the efficiency of the replacement work is high. Further, even in the case where there are multiple stages of guide sections 56, the upper surface of replacement frame 60 need only be supported by a member other than guide sections 56 at the uppermost stage of the shelf portion.

In the above-described embodiment, frame-side stopper 67 is an L-shaped member, but frame-side stopper 67 is not particularly limited thereto as long as frame-side stopper 67 abuts on rack-side stopper 57 to restrict the movement of replacement frame 60, and may have the same shape as rack-side stopper 57 or any shape. Although rack-side stopper 57 has protruding portion 59 having the abutment surface and the inclined surface, rack-side stopper 57 is not particularly limited thereto as long as rack-side stopper 57 abuts on frame-side stopper 67 to restrict the movement of replacement frame 60, and may have the same shape as frame-side stopper 67 or any shape.

In the above-described embodiment, rack-side stopper 57 and frame-side stopper 67 are fixed by screws and are removable; however, the configuration is not particularly limited to this, and one or more of rack-side stopper 57 and frame-side stopper 67 may be non-removable. In addition, although rack-side stopper 57 is a removable separate member, for example, a part of guide section 56 or the wall portion of accommodating section 52 that is difficult to remove may be used as rack-side stopper 57. Similarly, although frame-side stopper 67 is a removable separate member, for example, a part of frame body 61 or support portion 62 that is difficult to remove may be used as frame-side stopper 67.

In the above-described embodiment, replacement frame 60 includes name plate 65; however, the configuration is not particularly limited to this, and name plate 65 may be omitted. Also in rack system 50, frame-side stopper 67 and rack-side stopper 57 are engaged with each other, and replacement frame 60 supporting the replacement member is restricted from being removed in the pulled-out state, and thus, it is possible to prevent replacement frame 60 from falling or the like and to further enhance safety.

Although not particularly described in the above-described embodiment, accommodating rack 51 may include a lock section that locks the opening of door section 54 when moving to the replacement position. In accommodating rack 51, since replacement frame 60 is prohibited from being pulled out at the replacement position, worker W is safer.

The replacement frame of the present disclosure may be configured as follows. For example, a replacement frame of the present disclosure is used in a printing device including a printing section that performs printing process of viscous fluid on a processing object using a screen mask and is accommodated in an accommodating rack including a rack-side stopper, and the replacement frame includes a support portion that supports a replacement member used in the printing device, a passing section which is cut out on a frame inner side from a reference outer surface of the replacement frame and through which the rack-side stopper passes as the replacement frame moves, and a frame-side stopper that protrudes from the passing section to the reference outer surface, engages with the rack-side stopper to restrict removal of the replacement frame in a pulled-out state in which the replacement frame is pulled out from the accommodating rack.

In this replacement frame, the frame-side stopper and the rack-side stopper are engaged with each other, and removal of the replacement frame supporting the replacement member is restricted in the pulled-out state. In this accommodating rack, it is possible to prevent the replacement frame from falling and the like, and it is possible to further enhance safety. Further, in this replacement frame, since the passing section through which the rack-side stopper passes is formed and the frame-side stopper does not protrude from the outer surface, the frame-side stopper is unlikely to be caught by other members, and the replacement frame can be smoothly pulled out.

INDUSTRIAL APPLICABILITY

The present disclosure is applicable to a technical field of devices for performing a mounting process of a component.

REFERENCE SIGNS LIST

10: mounting system, 11: printing device, 12: print inspection device, 13: storage device, 14: automatic conveyance vehicle, 15: mounting device, 16: mounting inspection device, 17: X-axis rail, 18: loader, 19: management PC, 20: printing control section, 21: CPU, 22: printing section, 23: printing head, 24: printing moving section, 25: squeegee, 26: mask work section, 27: replacement section, 28: mask fixing section, 30: board processing section, 31: board conveyance section, 32: support member, 33: cleaning section, 34: cleaning member, 35: fluid supply section, 36: cartridge, 38: operation panel, 39: passage opening, 40: replacement unit, 40*a*: lifting and lowering space, 41: left unit, 42: receiving section, 43: rack moving section, 44: area detection section, 45: right unit, 46: receiving section, 47: rack moving section, 48: area detection section, 49: replacement control section, 50: rack system, 51: accommodating rack, 52: accommodating section, 53: handle, 54: door section, 55: caster section, 56: guide section, 57, 57B: rack-side stopper, 58: base portion, 59: protruding portion, 60: replacement frame, 61: frame body, 62: support portion, 63: cam follower, 64, 64B: passing section, 65: name plate, 66: caution area, 67, 67B: frame-side stopper, 68: support plate, 69: locking section, A: passage surface, B: reference outer surface, M: screen mask, S: board, P: component, W: worker

The invention claimed is:

1. An accommodating rack used in a printing device including a printing section configured to perform a printing process of viscous fluid on a processing object using a screen mask and accommodating a replacement frame in a shelf shape, the replacement frame including a support portion configured to support a replacement member used in the printing device and a frame-side stopper, the accommodating rack comprising:

an accommodating section configured to accommodate the replacement frame;

a guide section configured to support the replacement frame and guide the replacement frame between the accommodating section and an outside of the accommodating section; and a rack-side stopper protruding toward an inside of the frame from a reference outer surface of the replacement frame and engaging with the frame-side stopper to restrict removal of the replacement frame in a pulled-out state in which the replacement frame is pulled out from the accommodating rack, wherein the rack-side stopper is disposed on a surface of the guide section facing an interior of the accommodating section.

2. The accommodating rack according to claim 1, wherein the rack-side stopper is disposed on a distal end side of the guide section and has a protruding portion protruding upward to engage with the frame-side stopper.

3. The accommodating rack according to claim 2, wherein the rack-side stopper is formed with the protruding portion at a height at which the frame-side stopper passes over the protruding portion and restriction of movement is released when the replacement frame is in the pulled-out state and an end portion of the replacement frame is lifted.

4. The accommodating rack according to claim 1, wherein the guide section is disposed in multiple stages, supports a lower surface side of the replacement frame on an upper surface side, and supports an end portion upper surface of the replacement frame of a lower stage on a lower surface side of an upper stage.

5. A rack system comprising:

the accommodating rack according to claim 1; and a replacement frame accommodated in the accommodating rack, the replacement frame comprising:

a support portion configured to support a replacement member used in the printing device;

a passing section which is cut out on a frame inner side from a reference outer surface of the replacement frame and through which the rack-side stopper passes as the replacement frame moves; and a frame-side stopper protruding from the passing section to the reference outer surface and engaging with the rack-side stopper to restrict removal of the replacement frame in a pulled-out state in which the replacement frame is pulled out from the accommodating rack, wherein the frame-side stopper is an L-shaped member disposed on an inner surface of the replacement frame, and includes a support plate and a locking section, the support plate being a plate-shaped portion disposed along the inner surface of the replacement frame, and the locking section being continuously connected to the support plate and being a plate-shaped portion disposed substantially perpendicular to the inner surface of the replacement frame.

6. The rack system according to claim 5, wherein at least one of the rack-side stopper and the frame-side stopper is removably disposed.

7. A printing device comprising:

a printing section configured to perform a printing process of viscous fluid on a processing object using a screen mask;

the rack system according to claim 5; and a replacement section moving the accommodating rack between a replacement position and a standby position and configured to pull the replacement frame into a housing to replace the replacement member.

8. A replacement frame used in a printing device including a printing section configured to perform a printing process of viscous fluid on a processing object using a screen mask, the replacement frame being accommodated in an accommodating rack including a rack-side stopper, the replacement frame comprising:

a support portion configured to support a replacement member used in the printing device;

a passing section which is cut out on a frame inner side from a reference outer surface of the replacement frame and through which the rack-side stopper passes as the replacement frame moves; and a frame-side stopper protruding from the passing section to the reference outer surface and engaging with the rack-side stopper to restrict removal of the replacement frame in a pulled-out state in which the replacement frame is pulled out from the accommodating rack, wherein the frame-side stopper is an L-shaped member disposed on an inner surface of the replacement frame, and includes a support plate and a locking section, the support plate being a plate-shaped portion disposed along the inner surface of the replacement frame, and the locking section being continuously connected to the support plate and being a plate-shaped portion disposed substantially perpendicular to the inner surface of the replacement frame.

9. The replacement frame according to claim 8, wherein the passing section is formed on a lower surface side of the replacement frame.

* * * * *